(12) United States Patent
Kim

(10) Patent No.: US 9,556,826 B2
(45) Date of Patent: Jan. 31, 2017

(54) APPARATUS FOR REDUCING FRICTION IN EGR DRIVER

(71) Applicants: Hyundai Motor Company, Seoul (KR); Kia Motors Corp., Seoul (KR)

(72) Inventor: Young Min Kim, Yongin-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 42 days.

(21) Appl. No.: 14/627,658

(22) Filed: Feb. 20, 2015

(65) Prior Publication Data

US 2016/0108863 A1    Apr. 21, 2016

(30) Foreign Application Priority Data

Oct. 17, 2014  (KR) .................. 10-2014-0140438

(51) Int. Cl.

| F16K 31/44 | (2006.01) |
|---|---|
| F01L 3/00 | (2006.01) |
| F02B 47/08 | (2006.01) |
| F02M 25/07 | (2006.01) |
| F16C 33/10 | (2006.01) |
| F02F 11/00 | (2006.01) |
| F01L 3/08 | (2006.01) |
| F16K 1/32 | (2006.01) |

(52) U.S. Cl.
CPC ......... *F02M 25/0789* (2013.01); *F02M 26/67* (2016.02); *F01L 3/08* (2013.01); *F02F 11/00* (2013.01); *F02M 25/0724* (2013.01); *F02M 25/0793* (2013.01); *F02M 26/65* (2016.02); *F16K 1/32* (2013.01)

(58) Field of Classification Search
CPC ............... F16K 1/32; F01L 3/08; F02F 11/00; F02M 26/65; F02M 26/67; F02M 25/0724; F02M 25/0793
USPC ............ 251/214; 123/188.6, 568.17, 568.11, 123/568.18; 277/502
See application file for complete search history.

(56) References Cited

U.S. PATENT DOCUMENTS

2012/0325183 A1* 12/2012 Hatano ................... F16K 41/04
                                                                    123/568.11
2013/0105716 A1*  5/2013 Crochet, Sr. .......... F16K 5/0694
                                                                    251/214

FOREIGN PATENT DOCUMENTS

| JP | 52-49918 U | 4/1977 |
|---|---|---|
| JP | 2008-190504 A | 8/2008 |
| JP | 2012-97592 A | 5/2012 |
| KR | 10-2006-0029846 A | 4/2006 |
| KR | 10-2011-0028880 A | 3/2011 |
| KR | 10-2013-0021216 A | 3/2013 |

* cited by examiner

*Primary Examiner* — R. K. Arundale
*Assistant Examiner* — Kelsey Rohman
(74) *Attorney, Agent, or Firm* — Morgan, Lewis & Bockius LLP

(57) ABSTRACT

An improved apparatus for reducing friction in an EGR driver may include a space member mounted on a stem and having a side provided with a plurality of depressed portions to reduce a contact area with an inner side of a valve, such that the friction generated by a contact of the stem with a stem guide when the stem provided inside the valve vertically moves is reduced.

8 Claims, 3 Drawing Sheets

APPARATUS FOR REDUCING FRICTION IN EGR DRIVER

CROSS REFERENCE TO RELATED APPLICATION

The present application claims priority to Korean Patent Application No. 10-2014-0140438, filed Oct. 17, 2014, the entire contents of which is incorporated herein for all purposes by this reference.

BACKGROUND OF THE INVENTION

Field of the Invention

The present invention relates to an improved apparatus for reducing a friction in an Exhaust Gas Recirculation (EGR) driver, and more particularly, to an improved apparatus for reducing a friction in an EGR driver, in which a stem guide provided inside an EGR valve for a vehicle into which exhaust gas is inpoured and a space member having a side provided with a plurality of depressed portions so as to reduce a contact area with an inner side of the EGR valve at one point of an outer peripheral surface of a stem vertically moving along the stem guide are provided and a length of the existing stem guide is reduced due to the space member.

Description of Related Art

Generally, a method which is the most frequently used to suppress a generation of nitrogen oxide (NOx) generated from exhaust gas emitted from an engine which is equipped in a vehicle has used an exhaust gas recirculation (EGR) valve which adds some of cooled exhaust gas to a mixer to be sucked into a cylinder.

Describing a configuration of the EGR valve, the EGR valve includes a housing which is configured of an inlet and an outlet, an opening and closing apparatus which selectively opens and closes the inlet, and an actuator which operates the opening and closing apparatus to induce a reciprocating motion.

The inlet of the housing is connected to an exhaust manifold of the engine and the outlet thereof is connected to an intake manifold of the engine, such that some of the exhaust gas emitted from the exhaust manifold selectively moves to the intake manifold by the EGR valve depending on the operation of the actuator and the opening and closing apparatus.

The existing EGR valve takes an apparatus disclosed in Korean conventional art. According to the existing apparatus, a gear apparatus is provided between the actuator and the opening and closing apparatus and a recirculation operation of the exhaust gas is performed depending on the operation of the gear apparatus.

Meanwhile, FIG. 1 is a cross-sectional view of a valve according to the related art at a connection part into which the exhaust gas and the EGR gas are introduced. As illustrated in FIG. 1, it may be confirmed that a lip seal 40 is formed at an upper portion of a stem 20 vertically moving along a stem guide 30.

However, there is a problem in that an engine may stall or rattle while a vehicle in which the EGR valve is equipped is driven. As one of the causes of the problem, there is an increase in a sliding load due to an interference of a sliding part configured of the lip seal 40, the stem 20, and the stem guide 30 since heat generated by a friction generated from the stem 20 vertically moving along the stem guide 30 is transferred to the lip seal 40 to contract the lip seal 40.

Further, the stem guide 30 is exposed to the high temperature, and thus the friction is increased due to a vertical motion of the stem 20 while the vehicle is driven. As a result, several problems such as generating a warning light to a driver occur. Therefore, a method for reducing a friction which is generated at the time of the vertical motion of the stem 20 has been researched.

Therefore, various aspects of the present invention are directed to providing the stem guide 30 having a more reduced length than the related art and a space member having a side provided with a plurality of depressed portions to reduce the friction between the inner side of the valve and the stem 20.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an improved apparatus for reducing a friction in an EGR driver capable of preventing trackability badness of a vehicle occurring due to a friction by a stem vertically moving along a stem guide.

According to various aspects of the present invention, an improved apparatus for reducing a friction in an EGR driver may include a space member mounted on a stem and having a side provided with a plurality of depressed portions to reduce a contact area with an inner side of a valve, such that the friction generated by a contact of the stem with a stem guide when the stem provided inside the valve vertically moves is reduced.

The depressed portions may be disposed along the side of the space member and have a predetermined depth into an inside of the space member.

A central portion of the space member may be provided with a stem hole through which the stem penetrates and an upper surface of the space member may be provided with a plurality of upper concave portions around the stem hole to reduce a contact area with the inner side of the valve when the space member vertically moves.

A lower surface of the space member may be provided with a plurality of lower concave portions at a different angle from an angle at which the plurality of upper concave portions are disposed around the stem hole.

The depressed portions may be disposed along the side of the space member at the different angle from the angles at which the plurality of upper concave portions and lower concave portions are disposed around the stem hole.

Upper and lower portions of the space member may be provided with lip seals.

An upper portion of the space member may be provided with a bush made of a carbon material.

The upper portion of the bush may be provided with a lip seal member of which the lower portion is opened and the opened lower portion of the lip seal member may be provided with a fixed ring which fixes the lip seal member to a lip seal housing.

The lower portion of the space member may be provided with the stem guide having a predetermined length along an outer peripheral surface of the stem.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
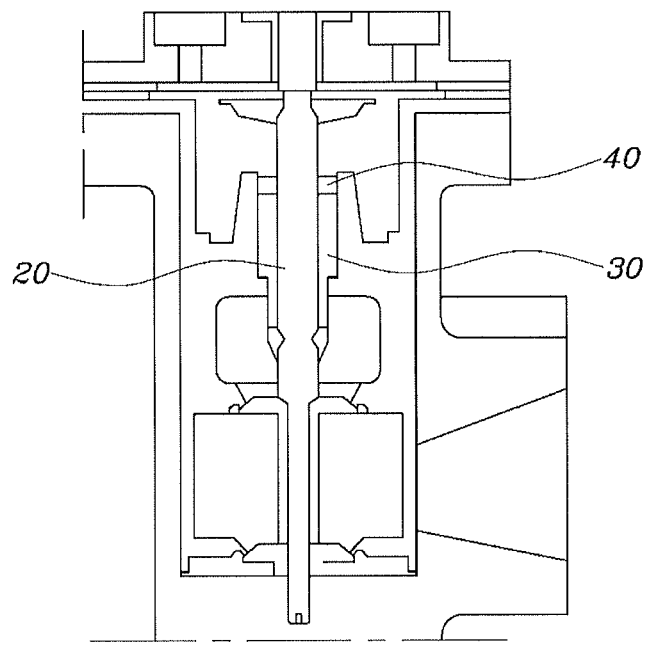
FIG. 1 is a cross-sectional view of a valve according to the related art at a connection par into which exhaust gas and EGR gas are introduced.
Figure 2:
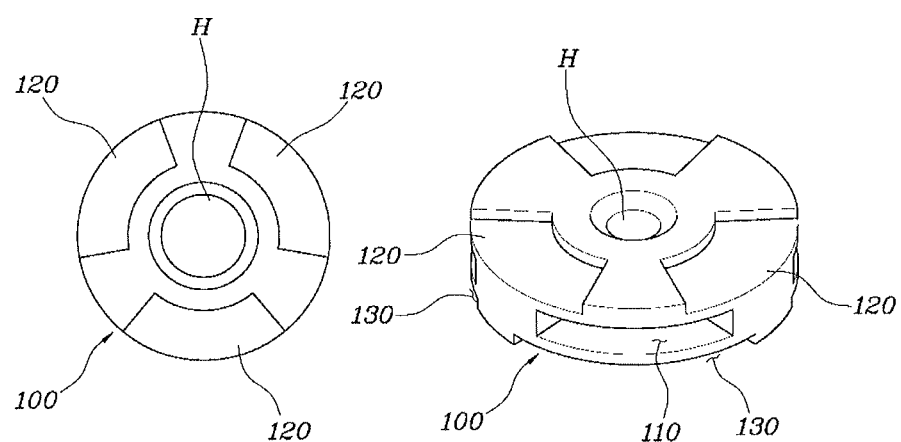
FIG. 2 is a perspective view showing an exemplary space member according to an exemplary embodiment of the present invention.
Figure 3A:
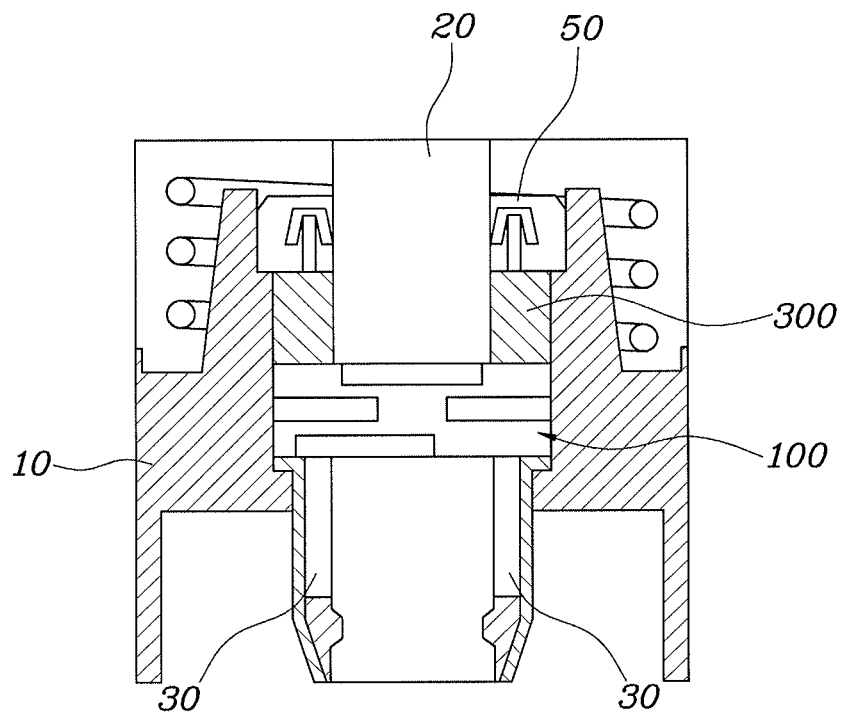
FIG. 3A and FIG. 3B are cross-sectional views of the exemplary space member which is disposed inside a valve while being coupled with a stem according to an exemplary embodiment of the present invention.
Figure 3B:
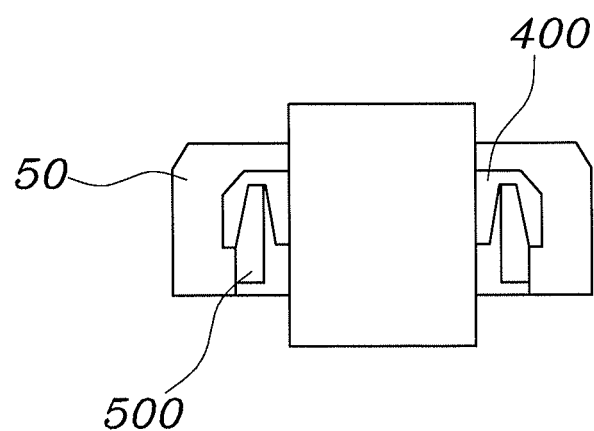

FIG. 2 is a perspective view showing a space member according to various embodiments of the present invention and FIG. 3A and FIG. 3B are cross-sectional views of the space member which is disposed inside a valve while being coupled with a stem.

As illustrated, a space member 100 according to various embodiments of the present invention generally has a cylindrical shape and the space member 100 has a plurality of depressed portions 110 provided along a side thereof.

A central portion of the space member 100 is provided with a stem hole H and the space member 100 vertically moves along the hole, along with the stem 20 while the stem 20 penetrates through the hole.

As illustrated in FIG. 3A and FIG. 3B in which the space member 100 is mounted in the stem 20, the stem 20 vertically moves inside the valve 10, along with the space member 100.

As illustrated, the side of the space member 100 is provided with the depressed portions 110, and as a result, a contact area with an inner side of the valve 10 may be reduced and a stem guide 30 along which the existing stem 20 may move is replaced by the space member 100, and as a result, the friction due to the movement of the stem 20 may be remarkably reduced.

A shape of the space member 100 will be described in detail below.

The plurality of depressed portions 110 are disposed along the side of the space member, and the number of depressed portions 110 may be variously changed but as illustrated, three depressed portions 110 may be disposed around the central portion of the space member so as to implement an optimal effect.

The shape of the depressed portion 110 may also be variously changed, but as illustrated in consideration of the durability of the space member 100, the depressed portion 110 may be disposed along the side of the space member having a predetermined depth into an inside of the space member 100 in a rectangular parallelepiped shape.

The depressed portion formed as described above reduces the contact area of the depressed portion 110 with the inner side of the valve 10, and thus more remarkably reduces the friction than that generated in the case in which the existing stem guide 30 is adopted at the time of the vertical movement of the stem 20.

Meanwhile, the central portion of the space member 100 is provided with the stem hole H through which the stem 20 may penetrate to vertically move the stem 20 and the space member 100 together while the stem 20 penetrates through the stem hole H.

In this case, to further reduce the contact area with the inner side of the valve 10 at the time of the vertical movement of the space member 100, an upper surface of the space member 100 is provided with a plurality of upper concave portions 120 based on the stem hole H.

That is, as illustrated, positions each rotating as much as 120° based on the stem hole H are provided with three upper concave portions 120 having a predetermined depth of grooves, in which similar to the previously described depressed portion 110, the upper concave portion 120 may also implement an effect of reducing the friction by reducing the contact area with the inner side of the valve 10 when the stem 20 vertically moves inside the valve 10.

In an exemplary embodiment of the present invention, the stem hole H may be dented to be slanted toward the center thereof.

Further, a lower surface of the space member 100 may be provided with a plurality of lower concave portions 130 at a different angle from an angle at which the plurality of upper concave portions 120 are disposed around the stem hole H, in which the plurality of lower concave portions 130 also reduce the contact area with the inner side of the valve 10 to serve to implement the effect of reducing the friction.

Meanwhile, the angle at which the upper concave portion 120 is disposed around the stem hole H may be different from the angle at which the lower concave portion 130 is disposed around the stem hole H. The reason is to prevent stiffness from reducing due to a twist when the space member 100 vertically moves.

Further, the depressed portions 110 may also be disposed along the side of the space member at a different angle from the angle at which the plurality of upper concave portions 120 and lower concave portions 130 are disposed around the stem hole H, which is also to prevent the stiffness from reducing due to the twist when the space member 100 vertically moves.

Consequently, the angles at which the upper concave portion 120, the depressed portion 110, and the lower concave portion 130 are disposed around the stem hole H are differently disposed from one another, and thus the upper concave portion 120, the depressed portion 110, and the lower concave portion 130 are formed to prevent the stiffness from reducing due to the twist when the space member 100 vertically moves.

Figure 4:
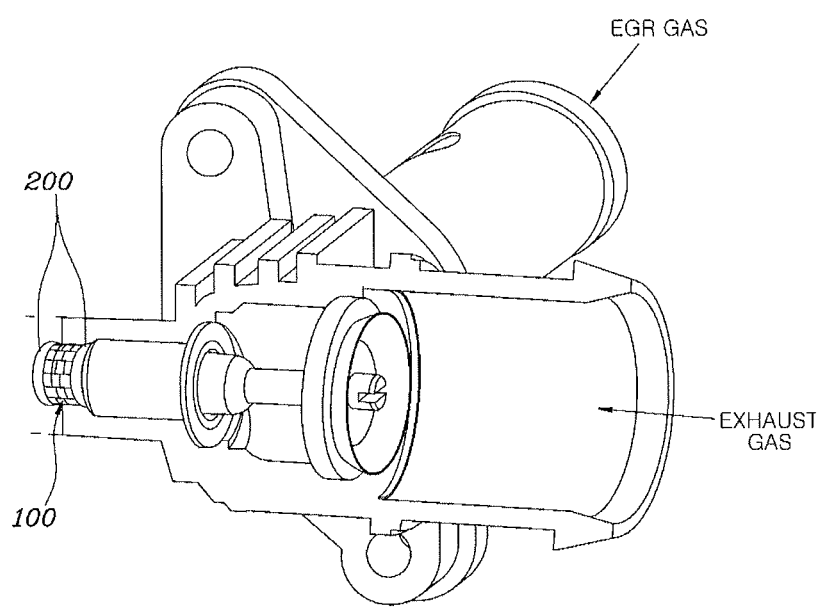
FIG. 4 is a perspective view of the exemplary space member which is disposed inside the valve while being mounted in the stem according to an exemplary embodiment of the present invention.

Meanwhile, FIG. 4 is a perspective view of the space member 100 according to various embodiments of the present invention which is disposed inside the valve 10 while being mounted in the stem 20, in which as illustrated, upper and lower portions of the space member 100 are provided with lip seals 200.

Due to the lip seal 200 and the space member 100, the friction may be minimized and the durability may be insured.

Meanwhile, as again illustrated in FIG. 3A and FIG. 3B, the upper portion of the space member 100 is provided with a bush 300 made of a carbon material.

An upper portion of the bush 300 is provided with a lip seal member 400 of which the lower portion is opened and the opened lower portion of the lip seal member 400 is provided with a fixed ring 500 which fixes the lip seal member 400 to a lip seal housing 50.

Further, the lower portion of the space member 100 is provided with the stem guide 30 having a predetermined length along an outer peripheral surface of the stem 20, in which the stem guide 30 has a more reduced length than the related art to implement an effect of reducing the friction more.

According to various embodiments of the present invention having the above configuration, even though the stem 20 vertically moves inside the valve 10, the friction is more remarkably reduced than the related art, thereby minimizing the friction and insuring the durability.

According to an improved apparatus for reducing a friction in an EGR driver of the various embodiments of the present invention configured as described above, it is possible to implement various effects such as insurance of the durability of the vehicle, improvement in fuel efficiency, and saving of the portion replacement costs by reducing the length of the existing stem guide and adopting the space member which is an apparatus having the reduced friction resistance.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An improved apparatus for reducing friction in an Exhaust Gas Recirculation (EGR) driver, comprising:
a space member mounted on a stem and having a side provided with a plurality of depressed portions to reduce a contact area with an inner side of a valve, such that the friction generated by a contact of the stem with a stem guide when the stem provided inside the valve vertically moves is reduced,
wherein the depressed portions are disposed along the side of the space member and have a predetermined depth into an inside of the space member, and
wherein a central portion of the space member is provided with a stem hole through which the stem penetrates, and an upper surface of the space member is provided with a plurality of upper concave portions around the stem hole to reduce a contact area with the inner side of the valve when the space member vertically moves.

2. The improved apparatus of claim 1, wherein the stem hole is dented to be slanted toward the central portion of the space member.

3. The improved apparatus of claim 1, wherein a lower surface of the space member is provided with a plurality of lower concave portions at a different angle from an angle at which the plurality of upper concave portions are disposed around the stem hole.

4. The improved apparatus of claim 3, wherein the depressed portions are disposed along the side of the space member at a different angle from the angles at which the plurality of upper concave portions and lower concave portions are disposed around the stem hole.

5. The improved apparatus of claim 4, wherein upper and lower portions of the space member are provided with lip seals.

6. The improved apparatus of claim 1, wherein an upper portion of the space member is provided with a bush made of a carbon material.

7. The improved apparatus of claim 6, wherein an upper portion of the bush is provided with a lip seal member of which a lower portion is opened and the opened lower portion of the lip seal member is provided with a fixed ring which fixes the lip seal member to a lip seal housing.

8. The improved apparatus of claim 6, wherein a lower portion of the space member is provided with the stem guide having a predetermined length along an outer peripheral surface of the stem.

* * * * *